United States Patent [19]
Miller et al.

[11] Patent Number: 5,641,348
[45] Date of Patent: Jun. 24, 1997

[54] EXHAUST CONDUIT COATING

[76] Inventors: Richard N. Miller, 1200 Belfair Dr., Pinole, Calif. 94564-1921; Noble Thomas Pessano, 121 Hawthorne Ave., Palo Alto, Calif. 94301

[21] Appl. No.: 511,906

[22] Filed: Aug. 7, 1995

Related U.S. Application Data

[63] Continuation of Ser. No. 397,548, Mar. 1, 1995, abandoned.

[51] Int. Cl.$^6$ ................................................. C04B 7/32
[52] U.S. Cl. ................... 106/38.3; 106/600; 106/692; 106/819; 252/62; 501/124
[58] Field of Search ................................ 106/600, 602, 106/605, 606, 692, 38.22, 38.3, 819; 501/124; 252/62

[56] References Cited

U.S. PATENT DOCUMENTS

| | | | |
|---|---|---|---|
| 3,804,058 | 4/1974 | Messenger | 106/606 |
| 4,037,015 | 7/1977 | Koike et al. | 106/38.3 |
| 4,050,948 | 9/1977 | Gandy et al. | 106/606 |
| 4,171,985 | 10/1979 | Motoki et al. | 501/124 |
| 4,217,144 | 8/1980 | Mathieu | 106/695 |
| 4,470,463 | 9/1984 | Holland | 166/293 |
| 4,482,384 | 11/1984 | Miller | 106/729 |
| 4,659,679 | 4/1987 | Falk | 106/705 |

FOREIGN PATENT DOCUMENTS 3410844  11/1984  Germany.

*Primary Examiner*—Paul Marcantoni
*Attorney, Agent, or Firm*—Bielen, Peterson & Lampe

[57] ABSTRACT

A mixture producing a slurry for coating metallic vehicle exhaust conduits utilizing a refractory cement and a caustic or alkaline salt binder. Sufficient amounts of water are also employed in the slurry resulting in a flowable material. The slurry flows over and hardens as a thin uniform coating on the interior surface of an exhaust conduit. The coating exhibits excellent adhesion to the metallic material, does not crack or chip under impact forces, and possesses a coefficient of thermal expansion similar to the underlying metallic structure.

13 Claims, 1 Drawing Sheet

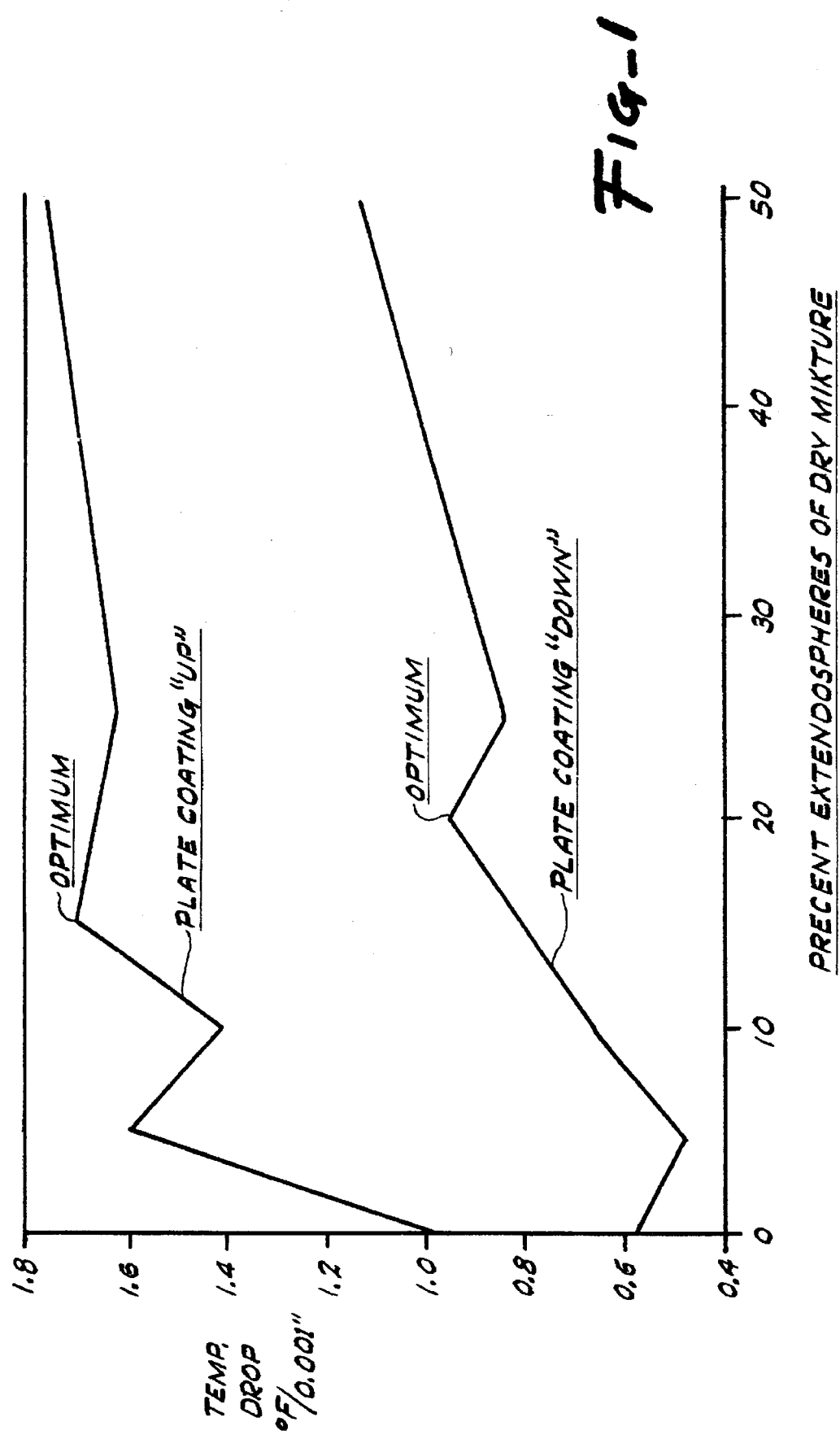

EXHAUST CONDUIT COATING

This is a continuation of application Ser. No. 08/397,548, filed 1 Mar. 1995, now abandoned.

BACKGROUND OF THE INVENTION

The present invention relates to a novel and useful mixture which forms a coating on the interior of a vehicle exhaust pipe.

Exhaust or tail pipes on vehicles are often plated with an exterior chromium layer to provide aesthetic appeal and to further protect the tail pipe from exterior corroding influences. In the past, the chromium coating on such tail pipes has been short lived. That is to say, chromic oxide tends to form on the chromium coating causing a blue or greenish tint on the same, ie: "bluing". Further oxidation of the chromium may also result in other oxidized states and corresponding hues.

Catalytic convertors appear to exacerbate the discoloration of chrome-plated exhaust pipes. It is believed that "bluing" begins at about 375 degrees centigrade. Although higher temperatures in the exhaust system, due to the catalytic convertor, appear to be favorable in reducing carbon monoxide and unburned hydrocarbons, wear and tear on the exhaust system occurs thereby.

In the past, liquified ceramic substances have been employed in to prevent the "bluing" of chrome-plated tail pipes. However, after several hundred miles of use, the substances appear to burn off and escape with the exhaust gases. Thus, continual recoating is required when using this material.

A coating for an exhaust system conduit which is durable, prevents bluing of chromium outer surfaces, and increases the exhaust gas temperature would be a notable advance in the automotive and motorcycle field.

SUMMARY OF THE INVENTION

In accordance with the present invention a novel and useful substance is provided for creating a protective long lasting coating on exhaust gas systems for vehicles.

The system of the present invention utilizes a powdered mixture which forms a slurry that flows over the external surfaces of a vehicle exhaust conduit. The slurry hardens under ambient temperature and gaseous conditions to form an extremely durable coating. The coating consist of a refractory cement, which consists largely of silica and alumina (alumino-silicate). For example, a refractory cement known as Spraytite-B may be used in this regard. Spraytite B is available under that name from Plibrico of Chicago Ill. Other refractory cements of similar composition are also suitable for use in the slurry of the present invention. It has been found that the refractory cement component may vary in weight in percentage between 90 and 98 percent of the dry mixture and 30 to 80 percent of the aqueous slurry. In certain instances the refactory cement is present between 65 and 80 percent by weight. The refactory cement, taken alone or combined with water, has also been ascertained to be unsuitable for coating exhaust pipes, since the coatings formed after hardening of the cement are brittle and exhibit poor adhesion to metallic surfaces being coated.

It has also been found that other additives to the refractory cements such as acidic compounds, fibers, binders, fillers, as well as the utilization of a preliminary coating of a heat resistant paint on the metallic surfaces fail to produce a good protective coating.

It is believed that such unsuccessful combinations do not properly etch the metallic surface. In addition such combinations form incohesive structures, and exhibit brittleness. The prior coatings, also, do not possess proper coefficients of thermal expansion that match the expanding and contracting metal substrate, under hot and cold conditions.

One of the components of the dry mixture or aqueous slurry of the present invention is a caustic or alkalai salt binder. For example, it has been determined that silica salts such as lithium metasilicate, potassium metasilicate and sodium metasilicate, suffice in this regard. Such salt binders range from 2–10 percent by weight of the dry mixture or aqueous slurry compositions. In certain instances the alkalai salt binder ranges between 2 and 5 percent by weight of the dry mixture or the aqueous slurry. In particular, sodium metasilicate salt tends to hydrate. Sodium metasilicate pentahydrate is particularly useful in combination with the refractory cement as a dry composition. The eventual water addition to form of the slurry for coating a metallic surface is more easily accomplished since the hydrated form of the sodium metasilicate is more readily dissolved than anhydrous sodium metasilicate in combination with the refractory cement. It has been further shown that sodium metasilicate, lithium metasilicate, and potassium metasilicate bind the refractory cement and form a hard coating on a metallic surface, such as steel. By weight, 2–10 percent of the caustic metallic salt combined with 90 to 98 percent refractory cement produces the mixture which easily forms a flowable slurry when combined with sufficient water. The caustic salt binder such as sodium metasilicate is believed to harden the coating derived from the slurry to a degree where the coating resists scratching and gouging. The flow characteristics of the slurry are excellent, in that a uniform thin coating is easily formed on metallic surfaces. Also, a very good adhesion is obtained when the coating is placed on a metal surface. Such adhesion is maintained during extreme heating and cooling of the metallic surface, be it a flat metal surface or a tubular metal surface. The coating was also found to form good adhesion on plastic and glass surfaces. This benign adhesion characteristic is believed to be a result of the hardened coating possessing a coefficient of thermal expansion which is similar to steel.

Due to the fact that the refractory cement readily oxidizes and rusts metals containing iron, a rust inhibitor such as sodium nitrite may also be employed in the mixture, eventually formed into the slurry and coating. As much as 1 percent by weight of such rust inhibitor may be employed in this regard.

To increase the adhesive properties of the coating of the present invention, a wetting agent may also be used, in the form of a ethoxylated triple-bonded glycol. Fatty acids, fatty amides, and various amines also serve as excellent wetting agents. The wetting agent may consist of up to 0.5 percent of the dry mixture prior to formation of the slurry coating. For example, a wetting agent known as Surfynols, manufactured by Air Products Inc. of Allentown, Pa. may be employed as the wetting agent in the mixture of the present invention. Such wetting agents added to the mixture have been observed to evaporate or burn off after initial heating of the hardened coating.

To further increase the heat resistance of the coating formed from the mixture of the present invention, microspheres of heat resistant material may be placed in the mixture. For example, alumina silicate glass spheres sized between 5 and 20 microns may be used in the mixture, and comprise up to 50 percent by weight of the dry mixture. In this combination the refactory cement may range between 50–98%. Again, the caustic salt would range between 2–10%. A product known as Extendospheres manufactured by the PQ Corporation of Valley Forge, Pa., may be used as the source of microspheres in the mixture of the present invention.

The coating formed from the aqueous mixture of the present invention may also be applied to piping and surfaces of all types to protect the same against heat or abrasion damage formed by flowable constituents. Where such piping is the exhaust system of a vehicle, the internal temperature may be raised to accentuate the pollution control properties of a catalytic converter. For example, carbon monoxide and unburned hydrocarbons are greatly diminished by the application of the coating of the present invention on the interior or exterior of an exhaust system conduit. Drying of the slurry may be accomplished in ambient conditions or by the application of dry air.

BRIEF DESCRIPTION OF THE DRAWINGS

FIG. 1 is a graph representing the increased temperature drop measured in degrees Fahrenheit per mil between coated and uncoated surfaces.

The following examples are included to further illustrate the invention which should be considered preferred embodiments thereof. The following examples are included only for purposes of illustration and are not intended to limit the scope of the invention unless otherwise indicated.

EXAMPLE 1

A thermal resistant paint was applied to a series of metallic plates. Prior to the hardening of the paint the following mixtures were applied onto the paint and allowed to dry together. A slurry of water and Kaowool having approximately 70% solids was mixed together and combined with the following trials using different solvents for application onto the soft thermal resistant paint atop a metal plate:

TABLE I

| TRIAL | SOLVENT % BY VOLUME |
| --- | --- |
| A | 10% EB |
| B | 10% DB |
| C | 5% EB, 15% PC |
| D | 10% PC |
| E | 5% EB, 15% PC |
| F | 5% EB, 5% NMP |
| G | 5% DB, 5% NMP | where: EB represents ethylene glycol butyl ether
DB represents diethyleneglycol butyl ether
PC represents propylene carbonate
NMP represents n-methyl pyrolidone All of the coatings appeared to be fragile in nature, flaking easily from the metallic plates. The coatings were then baked at 200° F. to further drive solvent from the mixture. All of the coatings exhibited cracking and poor adhesion strength.

The slurry produced above was placed within two motorcycle mufflers coated with paint. After drying several hours in ambient conditions it was noted that the coating within the mufflers were fragile, exhibiting poor adhesion to the steel inner surface.

Similar tests were conducted with a mixture of 23% water and 77% refractory caulking materials known as Tempcaulk 1800 and Tempcaulk 2400. Both slurries were placed on metallic plates. The slurries were observed to spread poorly over the metallic plates. The tests were repeated with an equal weight of liquid silica suspended in water, under the name "N-Brand", and Tempcaulk 2400. The same deficiencies were observed with respect to the Tempcaulk water mixture as were observed relative to the Kaowool slurries.

EXAMPLE 2

A refractory cement known as Spraytite B was combined with water, a rust inhibitor, and a wetting agent according to the following table:

TABLE II

| | BATCH | | | |
| --- | --- | --- | --- | --- |
| COMPONENT | A | B | C | D |
| Water | 26.9 gm | 26.8 gm | 28.8 gm | 28.8 gm |
| Spraytite B | 70.0 gm | 70.0 gm | 71.0 gm | 71.0 gm |
| NaNO₂ | 0.1 gm | 0.1 gm | 0.1 gm | 0.1 gm |
| Nalco 1050 (viscosity modifier) | 3.0 gm | 3.0 gm | 3.0 gm | 3.1 gm |

Spraytite B is available from Plyibrico of Chicago, Ill. and sold under that name. The following represents the typical components of the Spraytite B refractory cement.

| COMPONENT | PERCENT BY WEIGHT (CALCINED) |
| --- | --- |
| $Al_2O_3$ | 23.3 |
| $SiO_2$ | 69.8 |
| $Fe_2O_3$ | 0.8 |
| $TiO_2$ | 1.2 |
| CaO | 0.5 |
| MgO | 0.5 |
| Alk | 2.3 |

The batches A–D were individually air dried at 140° and placed on a steel plate heated to approximately 600° F. The plate was prepared by torching off the zinc coating on a galvanized steel plate. The coatings were then evaluated as to integrity and adhesion to the metal plate. Each batch A–D exhibited degrees of adhesion and poor-to-fair integrity as a hardened coating. The outer surfaces of the coating were hard, but the inner portions flaked badly.

With the objective of increasing the strength and adhesion of the coatings to the steel plates, the following batches were mixed according to the following table:

TABLE III

| | BATCH | | | | | |
| --- | --- | --- | --- | --- | --- | --- |
| COMPONENT (in grams) | A | B | C | D | E | F |
| Spraytite B | 100 | 99 | 98 | 95 | 90 | 90 |
| Sodium Metasilicate Pentahydrate | 0 | 1 | 2 | 5 | 10 | 10 |
| Water | 50 | 50 | 50 | 50 | 50 | 40 |

The above batches, except A, were placed on a heated metal plate similar to that found in Example 2. All coatings adhered quite well and possessed excellent integrity. That is, chipping and flaking appeared to be nonexistent. The mixture of Batch E was placed on a hot metal plate and tested for abrasion resistance. This test was accomplished by reciprocating a series of brushes at approximately 80 cycles per minute on the surface of the coating of Batch E. The brush bristles successively included brass, stainless steel, and stainless steel with weights added to the bristles producing a normal force on the coating of approximately 300 grams. After one hour the coating was measured for weight loss and determined to be less than 0.01 grams. No gouging was noticed by brushing. A more informal test was effected by repeatedly banging the coating with a hammer and scraping the coating with a screw driver. No gouging was noted in this test also.

EXAMPLE 3

To decrease the weight and increase the insulative properties of the coating of the present application, a filler material consisting of hollow alumina-silicate glass spheres, were added to the mixture. Specifically, hollow microspheres sold under the name Extendospheres, grade SG, available from the PQ Corporation, Valley Forge, Pa. were employed in this regard. The shell material had the following analysis:

TABLE IV

| Silica (as $SiO_2$) | 58–65% by wt. |
| Aluminum (as $Al_2O_3$) | 28–33% by wt. |
| Iron Oxide (as $Fe_2O_3$) | Max 4% by wt. |

A mixture of the coating material in dry form was prepared as follows:

TABLE V

| COMPONENT | WEIGHT % |
| --- | --- |
| Spraytite B | 94.8 |
| Sodium Metasilicate pentahydrate | 5.0 |
| Sodium Nitrite | 0.1 |
| Surfynol 104S | 0.1 |

Surfynol, a ethoxylated triple bonded glycol, was added as a wetting agent to increase adhesion of the slurry to a metallic surface. Surfynol is available under that name from Air Products Inc. of Allentown, Pa.

The dry components of Table V were then mixed with the Extendospheres and water to produce a slurry. The amount of the Extendospheres was increased up to 50% of the weight of the dry mixture. The following Table represents batches prepared:

TABLE VI

| BATCH (Weight in grams) | | | | | | |
| --- | --- | --- | --- | --- | --- | --- |
| | A | B | C | D | E | F |
| Table V dry component | 45 | 40 | 35 | 30 | 27 | 25 |
| Extendo spheres SG | 5 | 10 | 15 | 20 | 20 | 25 |
| Water | 14.0 | 17.0 | 19 | 24.0 | 24 | 26 |

The batches A–F were then tested in a similar manner on the hot metal plates, as depicted in Example 2. Each of the coatings appeared to adhere and exhibited integrity under the heat applied to the metal plate. In addition, the coatings were highly resistant to abrasion. FIG. 1 illustrates the effective temperature drop between the coated metal plate surfaces in the "up" or "down" positions relative to a heat source with increasing percentages by weight of the Extendospheres as shown in batches A–F of Table VI. The "optimum" amount of the Extendospheres is shown as being between 10% and 20% by weight.

EXAMPLE 4

A combination of 84.8% Spraytite B, 5% hydrated sodium metasilicate, 0.1% sodium nitrate, 0.1% Surfynol 104S, and 10% Extendopheres, grade SG, were combined into a mixture. This mixture generally corresponded to batch A of Table VI. Sufficient water was added to produce a slurry having good flow characteristics. The slurry was then applied to an exhaust system of a 1986 Toyota one-ton pickup to a thickness of ¼ inch on the interior exhaust pipe. In addition, a separate ¼ inch coating was applied to another similar exhaust pipe on the exterior surface. The two coatings were compared to a similar uncoated exhaust system. Temperature and emission tests were conducted using a Raytek non-contact temperature measuring gun and a California emissions standards test, respectively. The coatings measured approximately ¼ inch in thickness on the exterior or interior surfaces of the exhaust pipes as the case may be. The following table represents temperature measurements on the exhaust pipes described above.

TABLE VII

| PIPE CONFIGURATION | TEMPERATURE |
| --- | --- |
| Uncoated | 143° C. |
| Inside surface coated | 202° C. |

In addition, the following table delineates a series of tests comparing the coated exhaust pipe reduction in emissions, compared to an uncoated exhaust pipe:

TABLE VIII

| | OUTSIDE COATING | INSIDE COATING |
| --- | --- | --- |
| CARBON MONOXIDE REDUCTION | | |
| Average | 19.4% | 33.3% |
| Range | 10.0–24.1% | 30.0–41.4% |
| HYDROCARBONS REDUCTION | | |
| Average | 29.8% | 28.6% |
| Range | 23.0–40.2% | 18.6–45.6% |

EXAMPLE 5

A powder mixture was prepared using 84.8% spraytite B, 0.01% sodium nitrite, 0.1% surfynol 104S, and 5% sodium metasilicate pentahydrate. One-hundred (100) grams of this powder mixture was combined with 23 grams of water. After ten minutes, the powder mixture formed a slurry with the salts being dissolved. The slurry was then applied to a plastic bottled body which was rotated and tapped to spread the coating adhesive on the inside of the bottle. The same slurry was spread on a four (4) ounce glass bottle in the same manner. It was observed that all coatings floated smoothly down and around the cylinders of plastic and glass. Light tapping helped the flow and served to fill gaps on the surface left in the flow patterns. A second pouring on each glass and plastic bottle was used to fill in gaps without damage to the previous coating. Good coverage and good wetting in all surfaces were found. After setting, the coatings were tested and found to be durable on the plastic and glass surfaces.

It is believed that the reduction in the carbon monoxide and unburned hydrocarbons are a result of the increased temperature of the exhaust system gases afforded by the coatings, which is believed to increase the efficiency of the existing catalytic converter. Thus, retrofitting of the existing vehicles is possible to meet more stringent urban air quality standards imposed by governmental bodies.

While in foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A slurry forming a stable coating on metallic vehicle exhaust conduits during heating and cooling of the conduits, consisting essentially of:
   a. a thermosetting alumino-silicate refractory cement ranging from 30 to 80 percent by weight;
   b. an alkali metasilicate salt binder ranging from 2 to 10 percent by weight; and
   c. a sufficient amount of water to produce a flowable material when combined with said refractory cement and alkali salt binder.

2. The slurry of claim 1 in which said salt binder comprises a metallic caustic salt.

3. The slurry of claim 1 in which said caustic salt binder is metasilicate.

4. The slurry of claim 3 in which said caustic salt binder is selected from the group consisting of:
   lithium metasilicate, potassium metasilicate and sodium metasilicate.

5. The slurry of claim 1 in which said refractory cement ranges from 65 to 80 percent by weight, said salt binder ranges from 2 to 5 percent by weight, and said water ranges from 18 to 30 percent by weight.

6. The slurry of claim 1 in which additionally comprises a filler material of hollow members consisting of heat resistant material.

7. The slurry of claim 6 in which said filler material comprises up to 50% by weight, and said caustic salt binder comprises a metal metasilicate ranging between 2 and 10% by weight.

8. The slurry of claim 6 in which said salt binder is a metallic metasilicate ranging between 2 and 10% be weight.

9. The slurry of claim 8 in which said metallic metasilicate is selected from the group consisting of lithium metasilicate, potassium metasilicate, and sodium metasilicate.

10. The slurry of claim 8 which additionally comprises a rust inhibitor.

11. The slurry of claim 9 in which said rust inhibitor comprises sodium nitrite.

12. The slurry of claim 6 which additionally comprises a wetting agent.

13. The slurry of claim 12 in which said wetting agent comprises about 1% by weight.

* * * * *